April 15, 1952     C. B. SHOEMAKER     2,592,609
MAGNETICALLY CONTROLLED ROTARY WATER SPRINKLER
Filed Dec. 3, 1948     2 SHEETS—SHEET 1
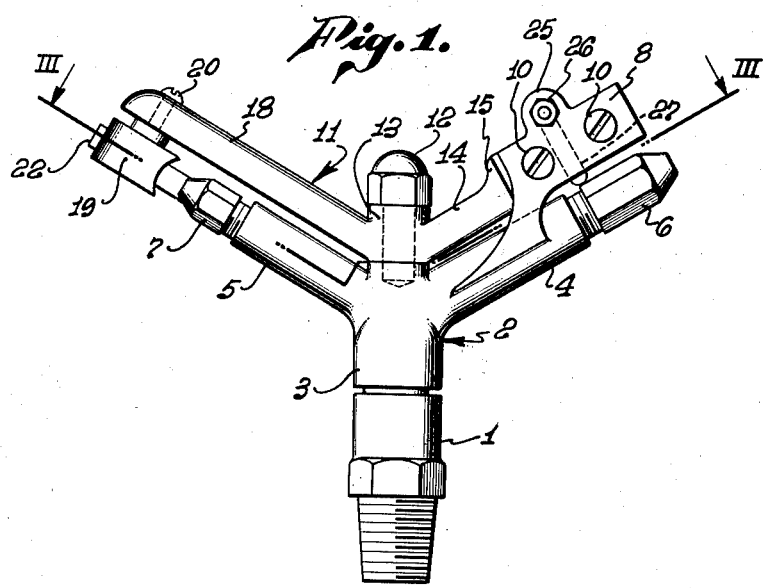
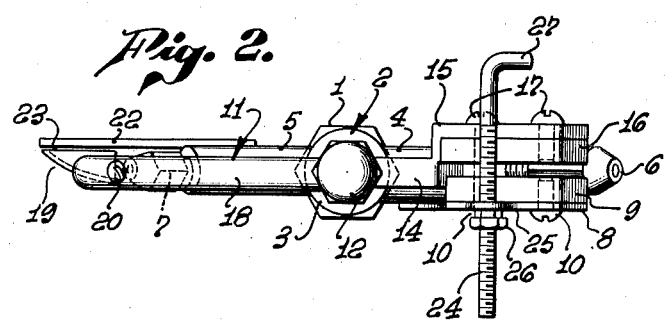
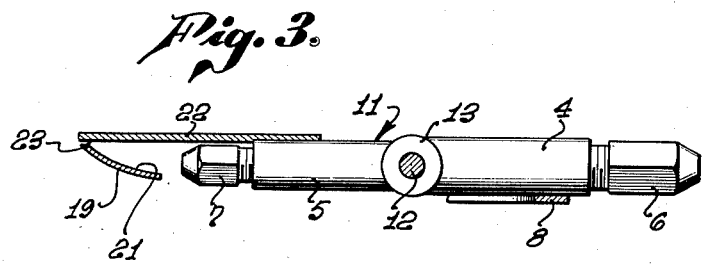
INVENTOR.
CLIFTON B. SHOEMAKER,
BY
ATTORNEY.

April 15, 1952     C. B. SHOEMAKER     2,592,609
MAGNETICALLY CONTROLLED ROTARY WATER SPRINKLER
Filed Dec. 3, 1948     2 SHEETS—SHEET 2
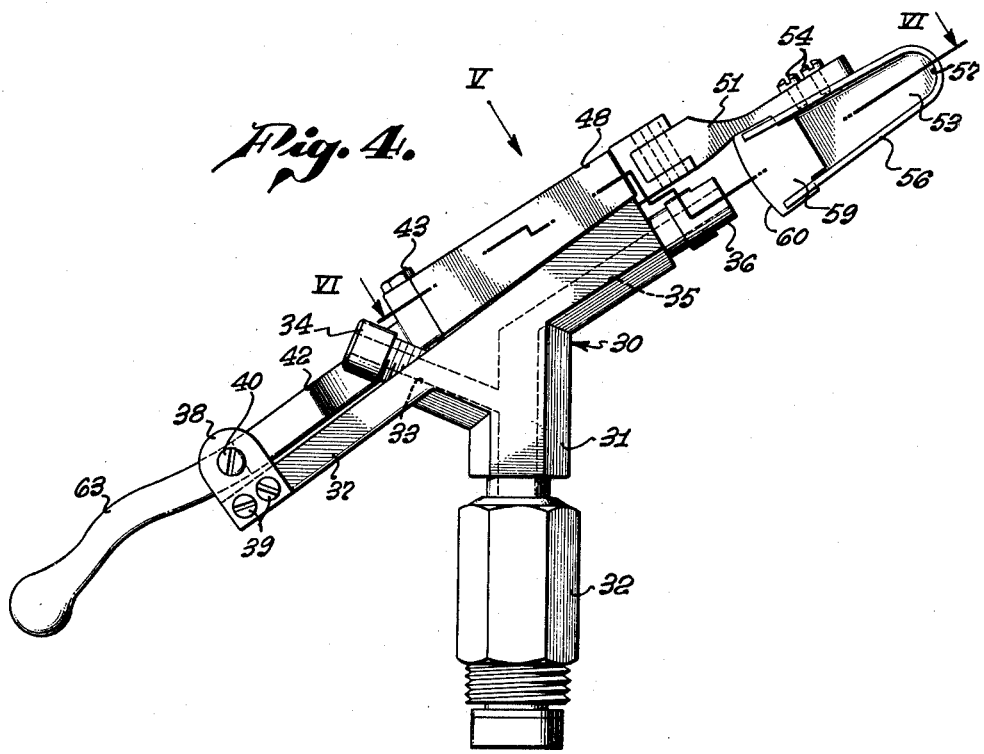
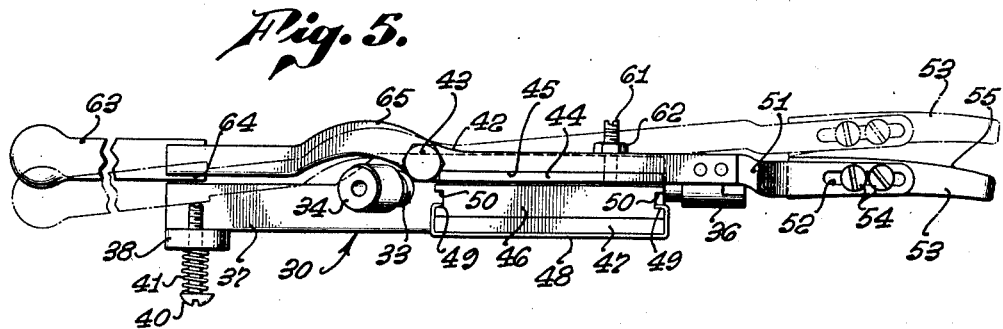
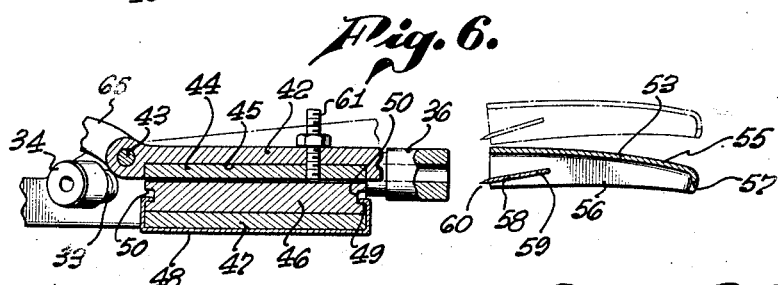
INVENTOR.
CLIFTON B. SHOEMAKER,
BY
ATTORNEY.

Patented Apr. 15, 1952

2,592,609

UNITED STATES PATENT OFFICE 2,592,609

MAGNETICALLY CONTROLLED ROTARY WATER SPRINKLER

Clifton B. Shoemaker, Glendora, Calif.

Application December 3, 1948, Serial No. 63,318

9 Claims. (Cl. 299—69)

This invention relates to improvements in water sprinklers. It is particularly directed to water sprinklers of rotary type which are adapted to slowly and to incrementally aerially distribute water over a generally circular large area, as for example, lawns, farms, orchards, and gardens. This application is a continuation in part of my abandoned application Serial No. 745,793, filed May 3, 1947, and entitled Magnetically Controlled Rotary Water Sprinkler.

The most efficient watering or irrigation of soil is accomplished by supplying and distributing water thereto at a rate which is substantially equivalent to the capacity of the soil to absorb the distributed water. All of the water is thoroughly absorbed and there is no excess water which may run off the soil or collect in areas which may not require irrigation. This invention contemplates a slowly incrementally rotating sprinkler which evenly distributes water over a large area. It permits water distributed to an increment of area to be absorbed in the soil before additional water again strikes the same increment of area.

It is recognized that sprinklers capable of rotating by a series of incremental steps (each step being but a fraction of the entire rotation) have been devised heretofore, but such prior sprinklers included springs or spring biasing means and, under continued use such springs imparted a variable bias to the rotatable element (thereby affecting the rate of rotation) and were readily corroded, crystallized or broken (thereby rendering the device inoperative). The present invention employs the force of water being ejected from the sprinkler and magnetic force to impart incremental rotation to the sprinkler head and eliminates the use of springs.

The primary object of this invention is to provide a rotary water sprinkler which is automatically operated to afford intermittent and incremental distribution of water over an area to be irrigated.

Another object of this invention is to provide a water sprinkler automatically actuated by an ejected stream of water and having magnetic means for rotating said sprinkler in incremental steps.

Still another object of this invention is to provide means whereby the distribution of water per unit of area during one complete revolution of the sprinkler may be adjusted as desired to allow distribution of water in accord with the rate of absorption of the soil.

This invention contemplates a rotary water sprinkler having rotatable members disposed for relative rotary movement with respect to each other, said members being intermittently and progressively rotatable, and the intermittent action being produced by cooperable stop means and magnet means on said members.

A further object of this invention is to provide a sprinkler having two relatively rotatable members each carrying magnetic means for causing relative movement of said members after impact of a stream of water against means carried on one member has separated the members whereby said magnet means causes both of said members to be incrementally displaced from their initial position.

A further object of this invention is to provide an automatic magnetically operated sprinkler wherein means for adjusting the length of arc through which the oscillating member swings is provided for regulating the size of the incremental area to which water is distributed.

This invention also contemplates the provision of adjustable means for varying the position of a deflector vane carried by an oscillating member with respect to a nozzle on a rotatable member.

Other objects and advantages of this invention will be readily apparent to those skilled in the art from the following description of the drawings and claims.

In the drawings:

Fig. 1 is a side elevation of a sprinkler embodying this invention.

Fig. 2 is a top view of the sprinkler shown in Fig. 1.

Fig. 3 is a sectional view taken in the planes indicated by the line III—III of Fig. 1.

Fig. 4 is a side elevation of a sprinkler embodying a preferred modification of this invention.

Fig. 5 is virtually a top view of the sprinkler shown in Fig. 4, the view being taken in the direction of the arrow indicated by Roman numeral V in Fig. 4.

Fig. 6 is a fragmentary sectional view of the sprinkler shown in Fig. 4, the section being taken in the planes indicated by the line VI—VI of Fig. 4.

Referring particularly to the embodiment of my invention shown in Figs. 1 to 3, the sprinkler is provided with suitable connection to a water supply pipe through an adapter coupling 1. The adapter 1 may be of any well known type which will permit rotation of the upper rotatable tubular nozzle member generally indicated at 2.

The rotatable nozzle member 2 is generally Y-shaped and comprises a vertical hollow stem 3 from which extend oppositely directed upwardly inclined tubular portions 4 and 5. The open ends of portions 4 and 5 may be internally threaded to receive in threaded engagement nozzles 6 and 7 respectively. It should be noted that tubular portion 4 has a slightly heavier cross section than that of the opposite portion 5 for the purpose of providing a slightly greater weight at one side of the axis of the vertical stem 3. The nozzles 6 and 7 may be of any desired size depending upon the pressure of the water to be supplied to the sprinkler and upon the range or area which it is desired to cover by the sprinkler. The tubular portions 4 and 5 are upwardly inclined at approximately 30 to 35 degrees in order to obtain a maximum throwing range for the water. Obviously, depending upon the specific circumstances under which the sprinkler is to be employed, the angular inclination of the tubular portions may be greater or less than 30 or 35 degrees.

The tubular portion 4 carries an upstanding flange 8 integrally formed therewith and provided with a portion of generally rectangular shape for supporting a correspondingly rectangularly shaped magnet 9.

The magnet 9 may be secured to the flange 8 by any suitable means such as spaced screws 10. The magnet 9 is preferably a permanent bar type magnet provided with poles of opposite polarity on its outer face. Alloys of the aluminum-nickel-cobalt-iron type are well suited for this purpose although other magnet steels may be used.

An actuating or oscillating vane member 11 is pivotally mounted for incremental rotation relative to the rotatable member 2 by a bolt or pin 12 extending through a hub 13, said bolt having its end threaded in an accommodating threaded recess provided in the top of the vertical stem 3. The bolt 12 is axially aligned with the axis of the vertical stem 3 and may be provided with a hexagonal head. The hub 13 may be provided with an internal bearing (not shown) to permit relatively frictionless oscillation of the actuating member 11.

Extending upwardly and outwardly above the tubular portion 4 and spaced therefrom, the actuating member has a relatively short arm 14 which is provided with an offset flange 15 carrying an armature 16 arranged to be in face-to-face relationship with the magnet 9, when the actuating vane member is at one limit of its travel. The armature 16 may be secured to the flange 15 in any suitable manner as by spaced screws 17. The armature 16 is preferably made of metal which is capable of being strongly attracted by magnet 9. It will be noted that armature 16 is of generally rectangular shape and presents a flat face of virtually the same area as the opposed corresponding face on the magnet 9.

The actuating member 11 also includes an oppositely disposed arm 18. Arm 18 is upwardly inclined from the hub 13 and extends above and is spaced from the tubular portion 5. The end of arm 18 reaches beyond the nozzle 7 for supporting a downwardly depending deflector vane 19 by means of a securing bolt 20 of any suitable type. The vane 19 is supported with its longitudinal center line in prolongation of the axis of the tubular portion 5 and is spaced outwardly from the end of the nozzle 7. As shown in Fig. 3, vane 19 may comprise a wall having a slightly curved outer section and positioned to present an inclined face 21 to a jet or stream of water ejected from the nozzle 7.

The tubular portion 5 has an outwardly projecting bar 22 secured thereto in any convenient manner. The bar 22 projects beyond the end of the nozzle 7 in prolongation of the tubular member 5 for abutting engagement at 23 at its outer end with an opposed edge of vane 19 in a manner more particularly described hereinafter.

In normal position, the actuating member 18 is positioned directly above the rotatable tubular member 3. Adjustment from this normal position for the purpose of controlling the operation of the sprinkler is afforded by the adjusting rod 24 carried by an upstanding lug 25 on the flange 8. The lug 25 and rod 24 are provided with threaded engagement and an adjusting nut 26 is operable to vary the distance between the lug 25 and the downwardly bent portion 27 at the opposite end of the rod 24. The bent portion 27 provides a stop for limiting relative pivotal movement of the actuating member 11 with respect to the rotatable member 2 by abutment of the outer face of the offset flange 15 with the bent portion 27.

In operation of the sprinkler shown in Figs. 1 to 3, water flows upwardly through the vertical stem 3, divides into two separate streams at the bifurcated portion of the rotatable member, and is discharged outwardly in opposite directions through the nozzles 6 and 7. The stream of water ejected from the nozzle 7 strikes against the inclined face 21 of the deflector vane and causes the actuating member to swing through an arc limited by the abutment of flange 15 against the bent end 27 of the adjusting rod 24. During rotation of the actuating member 11, the rotatable member 2 remains virtually stationary because of the frictional resistance between the member 2 and the adapter coupling caused by the pressure of water flowing through the rotatable member. Water ejected from nozzle 6 is uninterrupted in its path.

Immediately after swinging of the actuating member has been stopped by the adjusting rod, the magnetic forces of the magnet 9 act upon the armature 16 to pull the armature toward the magnet 9 to reverse the swinging of the member 11. The permanent magnet 9 has sufficient magnetic strength to attract the armature 16 with force enough to carry the deflector vane 19 through the stream of water ejected from nozzle 7 so that the vane may sharply and forcibly strike at 23 the bar 22. This impact as well as the coming together of the magnet and armature causes the rotatable member 2 to rotate through a relatively short increment of arc. This operation is intermittently repeated and the rotatable member rotates through complete revolutions by swinging in a series of successive incremental arcs.

It should be noted that the setting of nut 26 on the adjusting rod 24 will limit the amount of arc through which the actuating member will rotate, and adjustment of this rod so that the actuating member will swing through a larger or smaller arc will control the impact force delivered to the bar 22. The amount of incremental arc through which the rotatable member is rotated upon impact may thus be regulated and the quantity of water distributed to a unit of area is thus controlled to conform to the rate of absorption of the soil.

A preferred embodiment of this invention is illustrated in Figs. 4 to 6 which differs from the above described embodiment in the position of the magnets, the structure of the actuating arm, and the adjustability of the deflector vane with respect to an ejected stream of water.

The sprinkler generally indicated at 30 is provided with a vertical tubular stem 31 having an adapter coupling 32 for connecting the sprinkler with a water supply pipe. The adapter coupling permits relatively free rotation of the vertical stem 31 therein.

The rotatable member 30 is provided with a relatively short upwardly inclined bore 33 communicating with the bore in a tubular stem 31. The outer end of bore 33 may be threaded for threaded connection with a nozzle 34.

The rotatable member 30 is also provided with a bore 35 upwardly inclined and diametrically opposed to the bore 33, said bore 35 having a relatively greater length than bore 33. The bore 35 communicates with the bore in the tubular stem 31 above the intersection of bore 33 therewith. The outer end of bore 35 may be internally threaded for threaded connection with a nozzle 36. Bores 33 and 35 may be inclined upwardly at substantially the same angles as shown in the previous modification.

It should be noted that the tubular member 30 has a relatively heavy cross section of metal through which bore 35 is drilled. The opposite end of rotatable member 30 has a downwardly inclined portion 37 of relatively light cross section. The portion 37 is formed in prolongation of the portion of the member 30 which has the upwardly inclined bore 35. At the end of the portion 37 in an upstanding lug 38 secured to the portion 37 in any convenient manner as by screws 39.

The lug 38 carries an adjusting screw 40 which extends through the lug 38 in threaded connection therewith. A lock spring 41 interposed between the head of screw 40 and the outer face of lug 38 affords locking means for the screw when it is threaded to the desired position.

An actuating or oscillating arm 42 may be pivotally mounted on the rotatable member 30 by means of pivot pin 43 which is provided threaded connection with the rotatable member. The pivot pin 43 has its longitudinal axis inclined at an acute angle with the longitudinal axis of the vertical tubular stem 31 and is substantially perpendicular to the longitudinal axis of the inclined bore 35.

The actuating arm 42 carries a generally rectangularly shaped armature 44 in a recess 45 provided in one face thereof and adjacent to the pivot pin 43. The armature 44 has face to face contact with a correspondingly rectangular-shaped permanent bar magnet 46 carried on top of the rotatable member.

The permanent magnet may be seated on the top face of the rotatable member 30, said member having an upstanding flange 47 against which the magnet may rest. A generally channel-shaped clip 48 embraces the upstanding flange 47 and is provided with inwardly turned edge portions 49 accommodated within slots 50 provided in the end walls of the permanent magnet.

The actuating member is provided with an outwardly and upwardly projecting bar 51 in prolongation thereof which extends over and beyond nozzle 36. Bar 51 is provided with a longitudinally extending slot 52 for adjustably supporting a spoon or shoe 53 by any convenient means such as a pair of supporting screws 54 extending through said slots. The slot 52 affords longitudinal spacing adjustment of the spoon 53 with respect to the end of nozzle 36.

The spoon 53 comprises a slightly curved wall 55 having a greater width adjacent the nozzle 36 than at its outer end. The wall 55 has a flanged edge 56 extending continuously around the perimeter of the wall except for the edge opposing the nozzle 36. The outer end of the spoon may be generally semicircular in form and the flange 56 may be slightly recessed at 57 at the longitudinal axis of the spoon in order to obtain desired distribution of water.

Adjacent the nozzle 36 the flange 56 is provided with opposed inclined slots 58 for securing and holding a deflecting vane 59, said vane being of generally trapezoidal shape and having a bevelled edge 60 presented toward the nozzle 36. It should be noted that the longitudinal axis of the spoon and vane is substantially in prolongation of the longitudinal axis of the bore 35 and the attached nozzle 36.

A set screw 61 and a lock nut 62 are provided for adjustably spacing the armature 44 from the magnet 46 when the actuating arm is in normal position above the rotatable member 30. The set screw 61 extends through the arm 42 and the armature 44 adjacent the upper end of the armature and is provided with threaded engagement therewith so that the end of the set screw may abut against the opposed face of the permanent magnet. It will be apparent that set screw 61 by abutment with the magnet 46, will vary the position of the beveled edge 60 of the vane 59 with respect to the opening in the nozzle 36.

The opposite end of the actuating arm 42 is provided with an end portion 63 having a heavier metal section than the portion of the arm adjacent to and below the pivot pin 43. The heavier metal section 63 counterbalances the weight of the spoon 53 so that the actuating arm is virtually balanced at the pivot point of the arm at pivot pin 43.

The adjusting screw 40 is afforded abutment against the opposed end portion 63 of the actuating arm as at 64 in order to adjust the length of arc through which the actuating arm will swing. It should be noted that the actuating arm is provided with a slightly arcuate portion 65 slightly below the pivot pin 43 in order to permit rotation of the actuating arm relative to the rotatable member 30 without engagement of the arm against the nozzle 33.

In operation of the sprinkler head shown in Figs. 4 to 6, water passing through the vertical stem 31 is ejected from the nozzles 34 and 36. The water ejected from the nozzle 34 has uninterrupted flow. The stream of water ejected from nozzle 36 strikes against the deflector vane 59 into spoon 53 where it is interrupted and deflected outwardly at an angle from the plane of the spoon 53. The action of the water against the deflecting vane and the spoon, causes the actuating arm 42 to rotate relative to the rotatable member 30 until its lower portion 63 abuts at 64 the end of the adjusting screw 40. In this position it will be noted that the spoon and deflecting vane have been carried beyond the edge of the stream of water ejected from nozzle 36. The magnet 46 attracts and pulls the armature 44 toward it, and in so doing forcibly returns the actuating arm to its normal position above the rotatable member. The impact of the actuating arm, as the armature and magnet close together against rotatable member 30, causes the rotatable member to be rotated through a small arc. This operation is intermittently repeated thereafter.

The progressive rotation of the nozzle member is also influenced by water pressure and momentum of the actuating vane arm. Depending upon the water pressure and strength of the magnet used, incremental rotation of the nozzle member may be provided by impact of water against the deflector vane which moves the actuating arm and the pull of the magnet which causes the nozzle member to follow for a slight distance the actuating arm. The direction of rotation of the nozzle member in both modifications shown is dependent upon the relationship of the forces exerted by the water pressure, momentum of the actuating vane arm, the impact of the water against the deflective vane, and the strength of the magnet employed. While the sprinkler is normally designed to rotate in a clockwise direction, it is understood that if the magnetic pull is of a small magnitude and the water pressure is of a substantially great magnitude, the momentum of the actuating arm caused by impact of water against the deflector vane may cause the actuating vane arm to strike the nozzle member at its extreme position of rotation so as to cause the nozzle member to rotate in a counterclockwise direction.

It should be noted that the positive sharp impact of the actuating member against the rotatable nozzle carrying member is produced not only by the magnetic forces acting upon the armature but also by a negative pressure area created on the outer face of the deflector vane as it returns through the stream of water. The return swing of the actuating arm is also aided by the inertia of end 63 of relatively heavy cross section.

The position of the magnet and armature adjacent to the pivot pin 43 should be particularly noted because this construction maintains a portion of the armature in close relationship to the magnet regardless of the length of arc through which the actuating member is permitted to swing. Thus, positive means is provided for insuring that a portion of the armature is always under the influence of the magnetic forces of the magnet, and a positive pull to start the return swing of the actuating member is always present.

Since the position of the actuating member relative to the rotatable nozzle member during operation is readily adjusted by means of adjusting screw 40 and set screw 61, and the impact force striking against the nozzle member may thus be varied, the area of incremental arc to which water is distributed may be regulated to provide the most effective watering.

Longitudinal adjustment of the spoon with respect to the nozzle 36 is also provided for the purpose of positioning the deflector vane to provide the most effective operation of the sprinkler when different water pressures are encountered.

It will be apparent that this invention provides a novel automatic sprinkler construction in which the force of ejected liquid, the momentum of a pivotally mounted arm and magnetic forces are employed to produce progressive, step-by-step rotation of a sprinkler.

It may be noted that the invention is not limited to the illustrated forms; the angulation of the main and auxiliary nozzles 6 and 7 or 34 and 36 with respect to the axis of the supporting couplings or arms may be varied and the auxiliary nozzle 34 may be dispensed with altogether.

Whether the magnet is carried by the nozzle member or by the actuating vane member is immaterial as long as the cooperating member is capable of acting as the armature. Various changes and modifications may occur to those skilled in the art, and all changes coming within the scope of the appended claims are embraced thereby.

It will thus be apparent to those skilled in the art that this invention has provided a novel, automatically, magnetically, intermittently actuated rotatable sprinkler which may be adjusted to meet various different conditions of operation.

It is understood that the modifications of this invention described above are illustrative only and that it is not intended that this invention be limited except by the scope of the appended claims.

I claim:

1. In an automatically actuated, intermittently rotatable sprinkler, having a rotatable nozzle member and an actuating vane member pivotally mounted thereon, the provision of: magnet means carried by one of said members and cooperating armature means carried by the other of said members for restoring said members into a desired position; and adjustable stop means limiting relative motion of said members in another position for determining rate of incremental rotation of said nozzle member.

2. In an automatically actuated, intermittently rotatable sprinkler, having a rotatable nozzle member and an actuating member, including a deflector vane, pivotally mounted thereon, the provision of: magnet means carried by one of said members and cooperating armature means carried by the other of said members for restoring said members into a desired position; adjustable stop means limiting relative motion of said members in another position for determining rate of intermittent incremental rotation of said nozzle member; and means for adjustably positioning the deflector vane axially of the actuating member.

3. In an automatically actuated, intermittently rotatable sprinkler, having a rotatable nozzle member and an actuating vane member pivotally mounted thereon, the provision of: magnet means carried by one of said members and cooperating armature means carried by the other of said members for moving the actuating vane member under forces increasing in magnitude to forcibly strike said magnet means for rotatating said nozzle member through an incremental arc; and stop means selectively adjustable for regulating the rate of incremental rotation of the nozzle member.

4. In an automatically actuated, intermittently rotatable sprinkler, having a rotatable nozzle member and an actuating vane member pivotally mounted thereon, the provision of: magnet means carried by one of said members and cooperating armature means carried by the other of said members for forcibly delivering an impact against one of said members for causing incremental rotation thereof.

5. In an automatically actuated, intermittently rotatable sprinkler, having a rotatable nozzle member and an actuating vane member pivotally mounted thereon, the provision of: magnet means carried by one of said members and cooperating armature means carried by the other of said members for restoring said members into a desired position; and means for adjustably spacing the armature means with respect to the magnet means to regulate the magnitude of the impact forces of the armature against the magnet for regulating the degree of incremental rotation of the nozzle member.

6. In an automatically actuated, intermittently rotatable, sprinkler having a rotatable nozzle member and an actuating vane member pivotally mounted thereon, the provision of: magnet means carried by said nozzle member; armature means carried on said actuating vane member and disposed in face-to-face relationship with said magnet means in one position, said armature means being movable out of said position by a stream of water ejected from said nozzle member acting on said vane member; said magnet means and said armature means being cooperable to forcibly return said actuating vane member to said position, said armature means forcibly striking said magnet means for causing intermittent, incremental, rotary movement of the nozzle member; and means adjustably limiting relative displacement of said armature means from said position for regulating the rate of intermittent, incremental rotation.

7. In an impact type intermittently and progressively rotatable sprinkler, the combination of: a nozzle member pivotally mounted for rotation and having a nozzle portion lying at an angle to its axis of rotation; an actuating member pivotally mounted on said nozzle member and having a body portion normally disposed opposite to said nozzle portion and lying at one side of the pivotal axis of said actuating member; said actuating member being provided with an extension; a single bar magnet carried by the nozzle portion and having a face lying in a plane parallel to the axis of rotation of the nozzle member; an armature bar carried by said body portion of the actuating member and having a face lying in a plane parallel to and opposed to the plane of the magnet bar when in one position; said faces on said armature bar and said bar magnet being movable out of face-to-face relationship by relative movement of the nozzle member and actuating member about their respective axes into angular relationship, whereby portions of said faces adjacent to the vertex of said angle when in angular relationship remain under magnetic influence; said extension being adapted to contact the extremity of said nozzle member opposite to said nozzle portion.

8. In an impact type intermittently and progressively rotatable sprinkler, the combination of: a nozzle member pivotally mounted for rotation and having a nozzle portion lying at an angle to its axis of rotation; an actuating member pivotally mounted on said nozzle member and having a body portion normally disposed opposite to said nozzle portion and lying at one side of the pivotal axis of said actuating member; a single bar magnet carried by the nozzle portion and having a face lying in a plane parallel to the axis of rotation of the nozzle member; an armature bar carried by said body portion of the actuating member and having a face lying in a plane parallel to and opposed to the plane of the magnet bar when in one position; said faces on said armature bar and said bar magnet being movable out of face-to-face relationship by relative movement of the nozzle member and actuating member about their respective axes into angular relationship, whereby portions of said faces adjacent to the vertex of said angle when in angular relationship remain under magnetic influence.

9. In an automatically actuated, intermittently rotatable sprinkler, the combination of: a rotatable nozzle member adapted to eject a stream of water; an actuating member pivotally mounted on said nozzle member and carrying a vane adapted to obstruct the path of said stream of water in one position for actuation of said member; a bar magnet carried by said nozzle member; an armature carried by said actuating member; said bar magnet and armature being disposed in opposed parallel face-to-face relation in said one position and in angular relationship in another position, portions of said magnet and armature disposed adjacent to the vertex of the angle formed by said angular relationship remaining in close proximity for exerting a magnetic restoring force upon the actuating member.

CLIFTON B. SHOEMAKER.

REFERENCES CITED

The following references are of record in the file of this patent:

UNITED STATES PATENTS

| Number | Name | Date |
|---|---|---|
| 115,967 | Little | June 13, 1871 |
| 539,657 | Van Horn et al. | May 21, 1895 |
| 635,337 | Monroe | Oct. 24, 1899 |
| 1,400,603 | Harrington | Dec. 20, 1921 |
| 1,743,478 | Pratt | Jan. 14, 1930 |
| 1,997,901 | Englehart | Apr. 16, 1935 |
| 2,109,953 | Bates | Mar. 1, 1938 |
| 2,214,990 | Buckner | Sept. 17, 1940 |
| 2,314,702 | Higgins | Mar. 23, 1943 |
| 2,350,741 | Ford | June 6, 1944 |